April 18, 1933.  H. H. SULLIVAN  1,904,564
PRINT DRIER
Filed Dec. 3, 1930  9 Sheets-Sheet 1

Fig.1

INVENTOR
H. H. Sullivan
BY H. H. Simms
ATTORNEY

April 18, 1933. H. H. SULLIVAN 1,904,564
PRINT DRIER
Filed Dec. 3, 1930 9 Sheets-Sheet 3

Fig.3

INVENTOR
H. H. Sullivan
BY
ATTORNEY

April 18, 1933.   H. H. SULLIVAN   1,904,564
PRINT DRIER
Filed Dec. 3, 1930   9 Sheets-Sheet 7

INVENTOR
BY
ATTORNEY

April 18, 1933.  H. H. SULLIVAN  1,904,564
PRINT DRIER
Filed Dec. 3, 1930

Patented Apr. 18, 1933

1,904,564

UNITED STATES PATENT OFFICE

HARRY HEWES SULLIVAN, OF ROCHESTER, NEW YORK, ASSIGNOR TO PARAGON REVOLUTE CORPORATION, OF ROCHESTER, NEW YORK, A CORPORATION OF NEW YORK

PRINT DRIER

Application filed December 3, 1930. Serial No. 499,783.

The present invention relates to print washers and driers and more particularly to the type in which a sheet of exposed sensitized material is caused to travel through a bath and then through a drier. An object of this invention is to make it possible to obtain an increased drying speed so that the capacity of the machine may be increased. Another object of the invention is to provide a novel means by which the sensitized material is first caused to travel through an exposed area for the dual purpose of giving vision of the sheet to ascertain the exposure condition of the print and permitting the free escape of steam or vapor from the sheet at the starting of the heating where the vapor is greatest, and secondly through a drier chamber through which air is caused to travel in the direction opposite to the direction of travel of the sheet as it progresses toward the discharge end of the drier, so that the sheet is subjected to gradually cooler and drier air. Still another object of the invention is to provide a novel means of supporting heating devices in the heating chamber. A still further object of the invention is to provide a novel manner of arranging a gas burner in the drier so that the heat therefrom does not affect the chemicals on the sheet before they are washed off after leaving the bath.

To these and other ends, the invention consists of certain parts and combinations of parts all of which will be hereinafter described: the novel features being pointed out in the appended claims.

In the illustrated embodiment of the invention, 1 indicates a blue printing machine of known type from which exposed sensitized material 2 passes in sheet form to a washer.

The washer comprises a base frame 3 having a tank portion having two compartments $4^a$ and $4^b$. From one end of the tank rises an upright preliminary flushing portion 5 which receives at its upper end the sheet material from the blue print machine. Guiding means 6 is arranged in this flushing portion to direct the sheet material to the tank portion and while passing through the preliminary flushing portion spraying devices 7 spray water or other liquid on the sensitized sheet. In the tank portion, the sheet is, by guiding means 8, conducted to the opposite side of the tank where the sheet passes to a heater. While passing through the first compartment of the tank, devices 9 supply water to the sheet and while passing through the second compartment device 10 supply bichromate and hypo solutions to the sheet.

Figure 1:
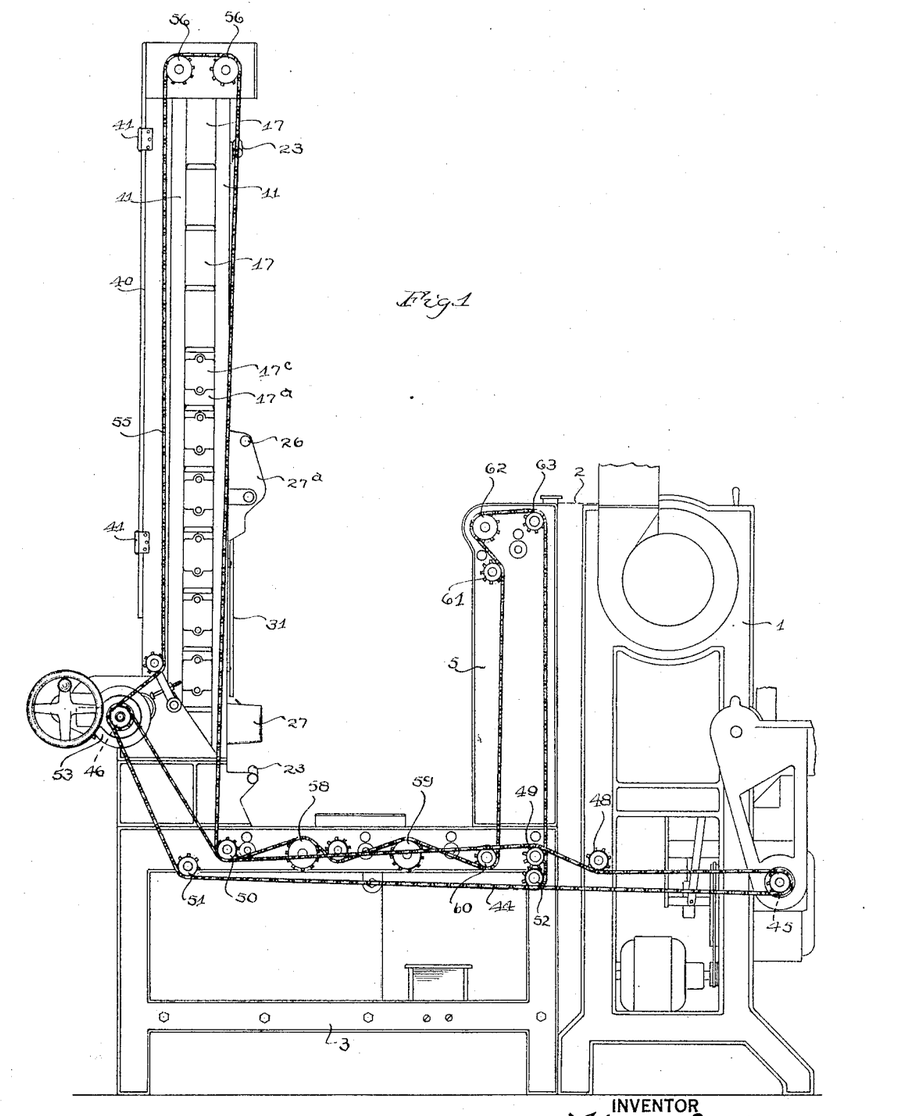
Fig. 1 is a side view of a washer and drier embodying the present invention and connected to a blue printing machine from which it receives the exposed sensitized material.
Figure 2:
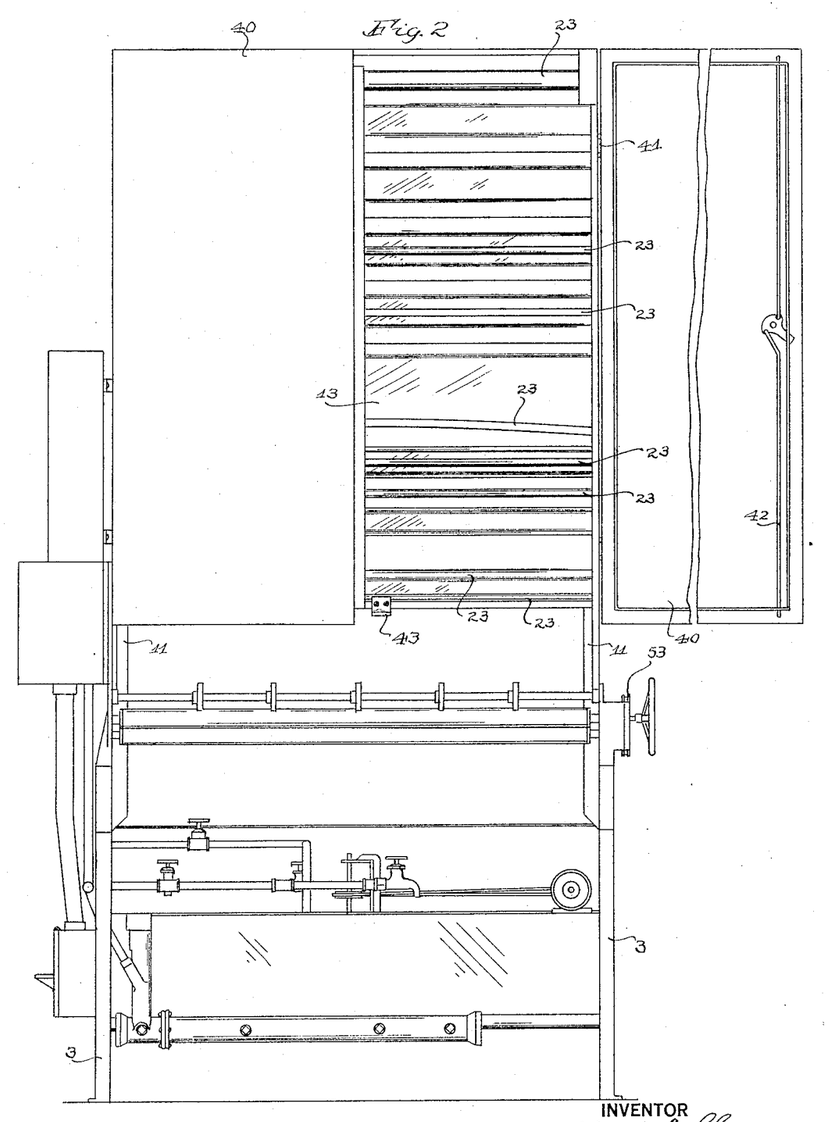
Fig. 2 shows the washer and drier in elevation from the discharge end.
Figure 3:
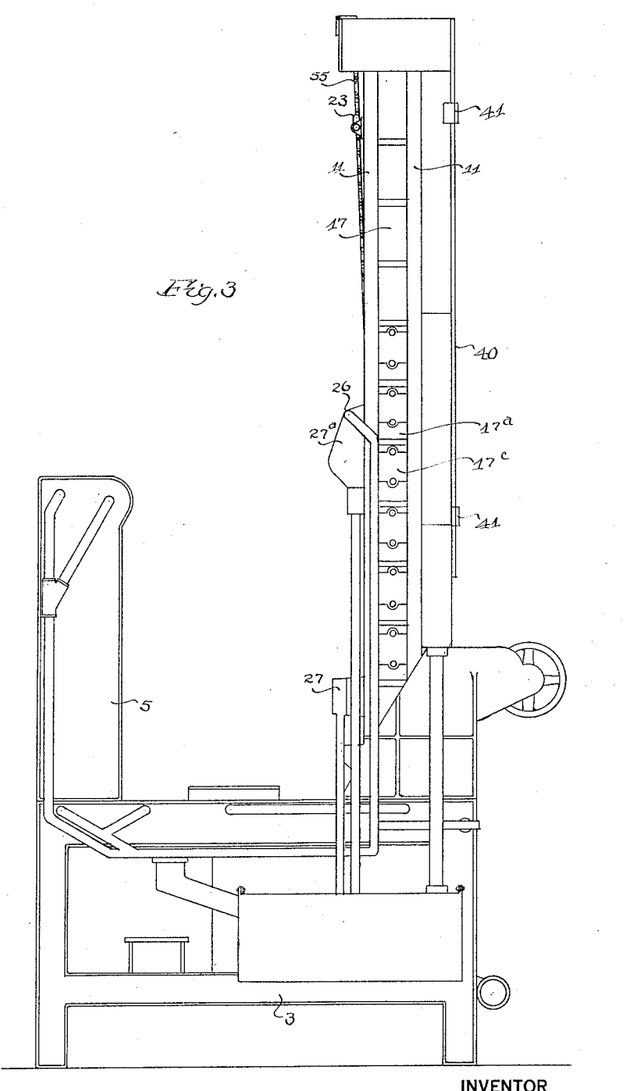
Fig. 3 is a side view of the washer and drier opposite from that shown in Fig. 1.
Figure 4:
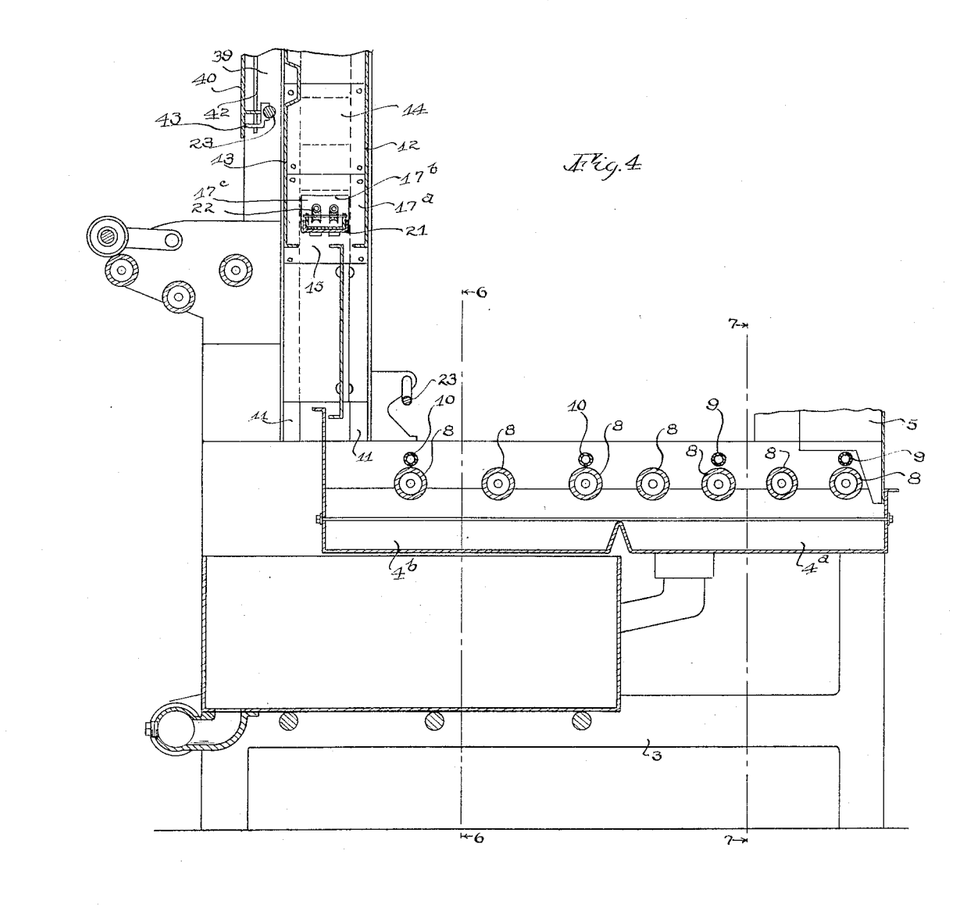
Fig. 4 is a fragmentary section through the machine when heated by electricity.
Figure 5:
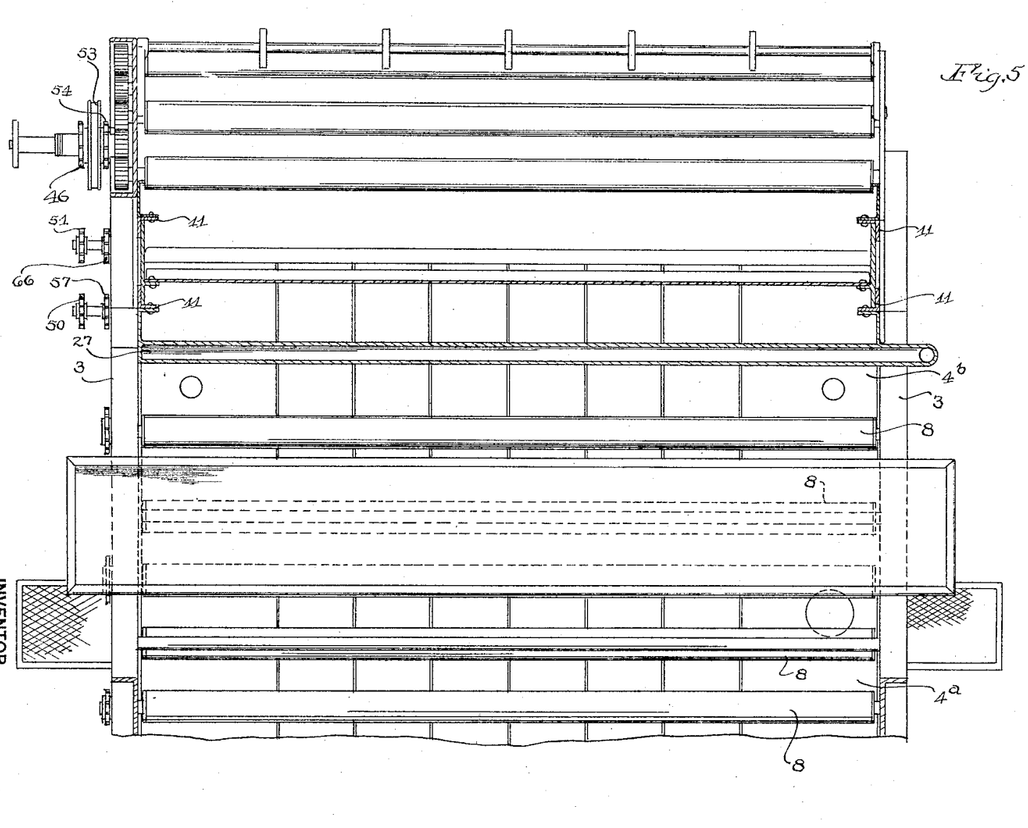
Fig. 5 is a horizontal section through the machine.
Figure 6:
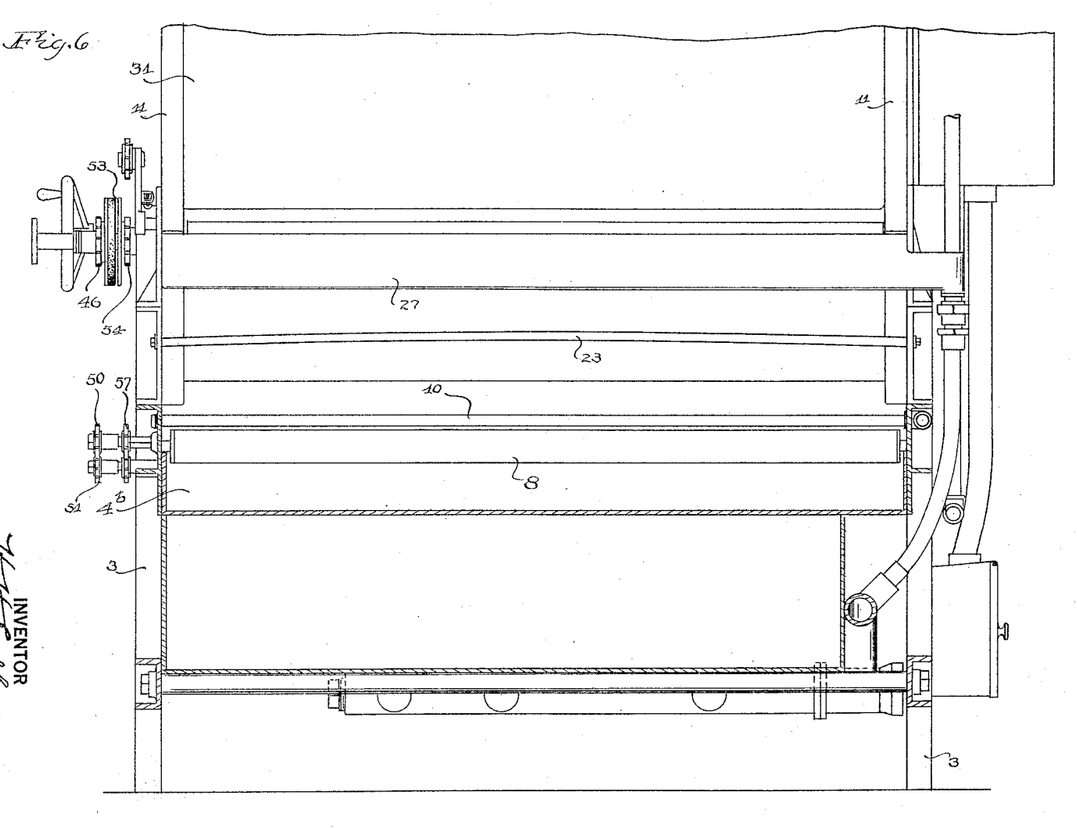
Fig. 6 is a vertical section on the line 6—6, Fig. 4.
Figure 7:
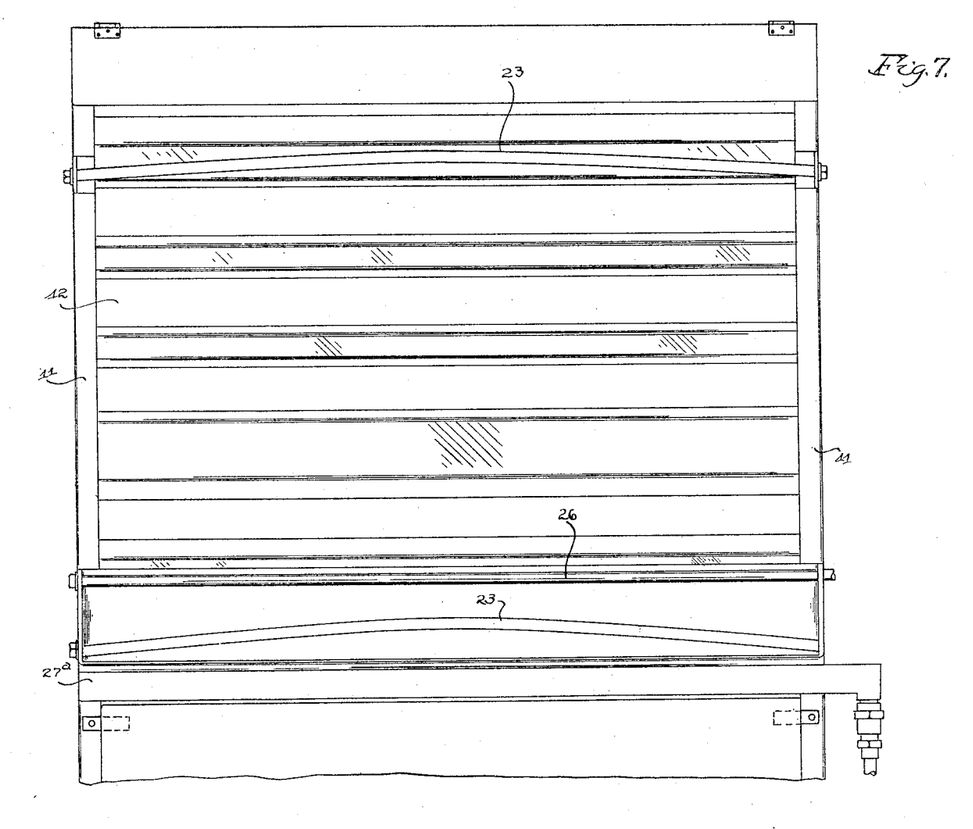
Fig. 7 is a fragmentary view of the inner face or side of the upright drier.
Figure 8:
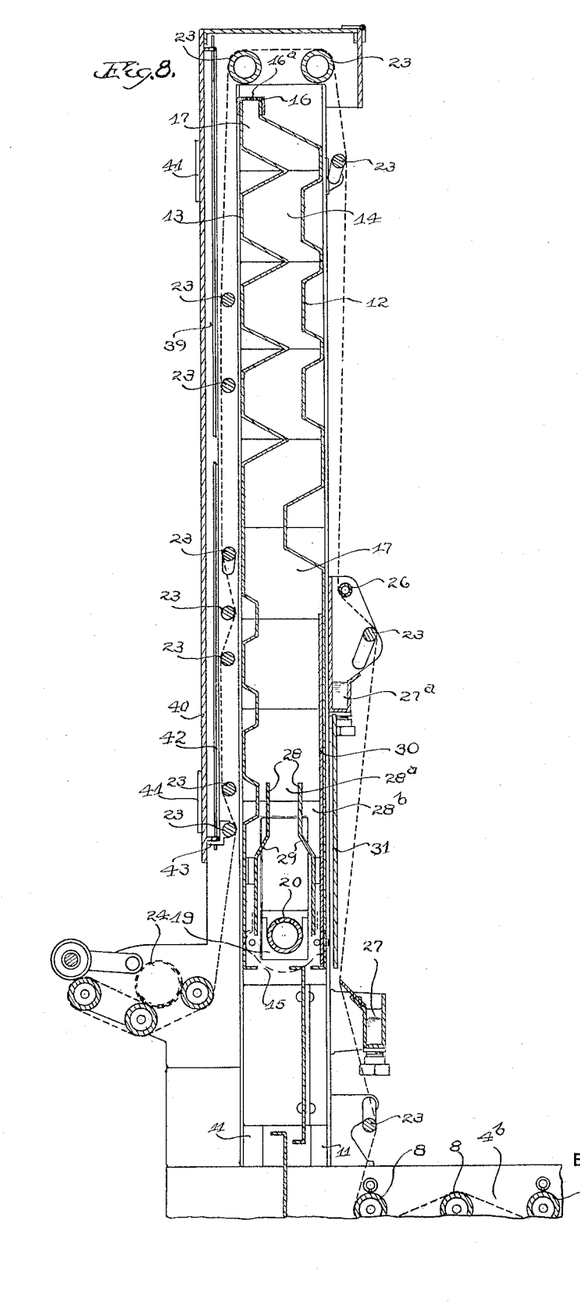
Fig. 8 is a vertical section through the drier showing the use of a gas burner therein.
Figure 9:
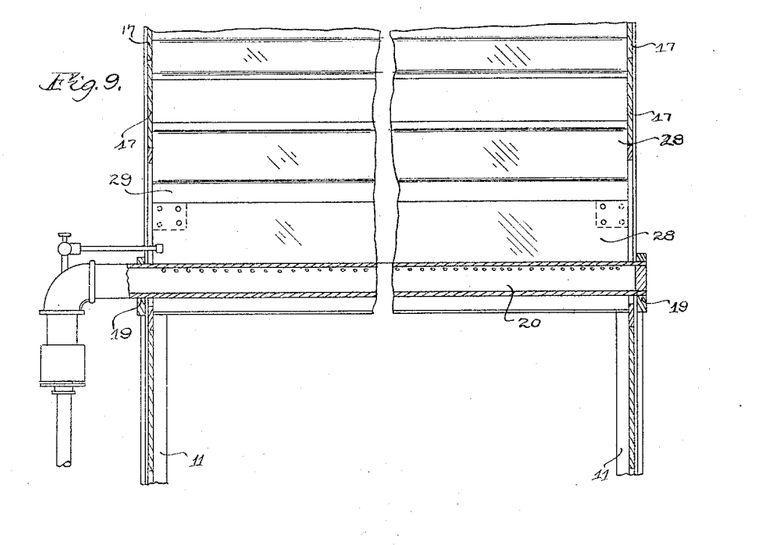
Fig. 9 is a fragmentary vertical section through the drier gas heated.
Figure 10:
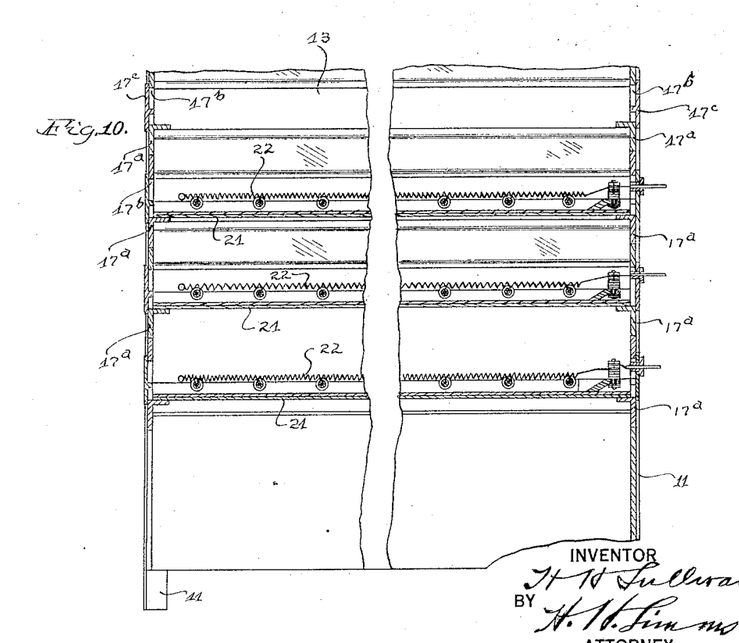
Fig. 10 is a fragmentary section through the drier electrically heated.

The heater, in this instance, rises vertically from that end of the tank or washer opposite the preliminary flushing portion and comprises four angle iron uprights 11 supported from the tank frame, two on each side of the tank. The two uprights on one side of the machine connect with the two uprights on the opposite side of the machine by two walls 12 and 13 which are spaced apart between their upper and lower ends to form a heater chamber 14, the walls being formed of sheet metal and bent horizontally between their ends to form a zigzag passageway. At their bottoms, the walls are separated at 15 while at their tops they are connected by a wall 16 which is provided with openings 16ª for the exhaust of heat. The members of each pair of uprights on each side of the heater are connected by a plurality of plates 17 arranged in abutting relation one above the other and removably secured to the uprights by bolts. In the embodiment shown in Fig. 9, these except for the lowest one are solid and form the end walls of the heating chamber. The lowest plate on each end has a seat 19 to support, with the like plate at the other end, a gas burner tube 20. In the embodiment shown in Figs. 1 and 4, the lowest plates 17ª each has an opening 17ᵇ closed by a removable plate 17ᶜ. Adjacent each opening is a lug 17ᵈ which by a support 21 connects with a like lug on a plate 17 on the opposite end of the heater and in a horizontal plane with said plate and serves as a support for a heating device 22 in the form of an electric resistance.

The sensitized material is by guides 23 directed upwardly over the inner side of the heater, thence over the top of the heater and finally downwardly on the outer side of the heater to a roll 24 adjacent the outer side of the heater. The sensitized material as it first passes upwardly on the inner side of the heater has just been flushed with a chemical and in order to flush the sheet to remove this chemical, a flushing tube 26 sprays water on the sheet and this water passing down the sheet falls into a trough 27ª arranged above the lower end of the heater chamber or a trough 27 arranged below the lower end of the heater but above the tank so that water will not fall into the chemical part of the tank, the troughs discharging the water at one end to be conducted to any suitable point.

It is desirable that the side walls at the lower part of the heater be not too greatly heated, as not only is the heater as a whole not properly heated, but too great heat is conducted to that portion of the sensitized sheet as it passes from the chemical flooding portion of the tank. This condition is likely to exist when a gas burner is arranged at the lower portion of the heater chamber. To avoid this overheating of the lower part of the heater chamber, two baffle plates 28 formed of sheet iron are arranged on opposite sides of the burner 20 in spaced relation to each other and to the walls of the heater chamber. The walls are bent or deflected inwardly at 29 between their upper and their lower edges to provide a constricted portion in the chamber or space between the baffle plates. The flame from the burner 20 strikes the plates and heats them and fresh air passes upwardly between the plates at 28ª and also between the side walls and the plates at 28ᵇ. In this way, the side walls adjacent that portion of the film below the trough 27ª and above the trough 27 are not subjected to intense heat. In order to still further reduce this heat condition between the troughs 27ª and 27, asbestos plates 30 and 31 are arranged respectively on the inner and outer faces of the lower portion of the inner wall 12.

Another novel feature of this invention is the formation of a drier chamber 39 on the outer face of the heater leaving the inner face of the heater exposed for the dual purpose of permitting the operative of the machine to ascertain the condition of the sheet material as it passes to the heater and of permitting that portion of the sheet which gives off the maximum vapor to be unconfined.

The drier chamber is formed by an enclosure or casing which covers the outside face of the heater substantially to the bottom thereof and is provided at the top with a hood portion 1, extends over the top of the heater and projects beyond the inner side where it opens to the atmosphere. This drier chamber also opens at its bottom or adjacent the lowermost portion of the heater on the outside of the latter. The adjacent lowest guide 23 is so situated that it holds the sheet material spaced from the adjacent heater wall and also spaced from the inner face of the enclosure. In this way, cold air passes upwardly into the enclosure or drier chamber on the inner and the outer faces of the sheet. At this lowest point, the sheet is substantially dry but the cold air current cools it before its final discharge. As the air rises, it becomes gradually hotter while, at the same time, meeting portions of the sheet which are more moist and hotter until the upward current of air reaches that portion of the drier chamber above the heater where it mixes with hot gases from the openings 16ª at the top of the heater chamber. These hot gases strike the under side of the sheet passing over the top of the heater, produce a drying action on the sheet and issue at the edges of the sheet to mix with and heat the air from the drier chamber, causing an increased expansion of said air so that the speed of the current of air through the drier is increased. the air and gases issuing at 16ª from the drier at that portion of the sheet adjacent the upper end of the inner face of the heater.

In order that access may be had to the drier chamber, the outside wall of said chamber has two doors 40 therein extending from the lower edge of the chamber upwardly to the top of the chambers. The combined widths of the two doors is substantially equal to the width of the drier chamber so that when opened on their hinges 41 they will expose substantially the entire chamber in order that the sheet may be reached to be laced through and over the guides. A locking bolt 42 on one of the doors may engage the keeper 43 on the guide 23 to hold the doors closed.

The blue printing machine is utilized in the present embodiment for driving the sheet 2 and to this end a sprocket chain 44 passes from a sprocket wheel 45 on a shaft of the blue printing machine to a sprocket wheel 46 on the shaft 47 of the drier, after passing over idlers 48, 49 and 50 in travelling to the sprocket wheel 46 and over idlers 51 and 52 in returning to the sprocket 45. A manually operable clutch 53 connects the sprocket wheel 46 with a sprocket wheel 54 which by a sprocket chain 55 connects with sprocket wheels 56 on the roller guides 23 at the top of the drier. From the wheels 56, the chain 55 passes to wheels 57, 58, 59 and 60 on the guide rollers 8, thence to wheels 61, 62 and 63 on guide rollers 6, thence to rollers 64 on the first guide roller 8, to an idler wheel 65 back to an idler wheel 66 and wheel 54 so as to drive the sensitized sheets by means of the guide rollers 6, 8 and 23 and sprocket chain 55 from the blue printing machine by means of the sprocket chain 44.

What I claim as my invention and desire to secure by Letters Patent is:

1. A drier for blue print washers comprising an upright heater, means for guiding the sheet print material upwardly on one side of the heater exterior thereof, thence over the heater, and finally downwardly on the opposite side of the heater, and an enclosure for that portion of the sheet travelling downwardly on the last named side open at its bottom and forming a drying chamber, the side on which the material is travelling upwardly being open to expose the sheet material said drying chamber having an outlet at the top to create a draft upwardly about the downwardly moving part of the sheet.

2. A drier for blue print washers comprising an upright heater, means for guiding the sheet print material upwardly on one side of the heater, thence over the heater, and finally downwardly on the opposite side of the heater, and an enclosure for that portion of the sheet travelling downwardly on the last named side open at its bottom and forming a drying chamber, said enclosure extending above the heater and projecting forwardly at the front of the heater and the latter being open to expose the sheet material and the drying chamber having an outlet at the top to create a draft upwardly about the downwardly moving part of the sheet.

3. A drier for blue print washers comprising an upright heater, means for guiding the sheet print material upwardly on one side of the heater, thence over the heater, and finally downwardly on the opposite side of the heater, and an enclosure for that portion of the sheet travelling downwardly on the last named side open at its bottom and forming a drying chamber, said enclosure extending above the heater and projecting forwardly at the front of the heater and the latter being open to expose the sheet material and the drying chamber having an outlet at the top to create a draft upwardly about the downwardly moving part of the sheet, the heater chamber being open at its top beneath the sheet and within the enclosure so that the heat from the heating chamber commingles with that from the drying chamber and passes from the drying chamber at the top of the latter.

4. A drier for print washers comprising a vertically arranged interior heating chamber, means guiding the sheet material upwardly on one side of the chamber exterior thereof, thence over the chamber and downwardly on the opposite side of the chamber, and a drier chamber on the latter side of the heating chamber open at its bottom and its top so that a draft of air is created to travel upwardly through the drier chamber, the front side of the drier being open to expose the sheet material.

5. A drier for print washers comprising a vertically arranged heating chamber open at its top and its bottom, means guiding the sheet material upwardly on one side of the heating chamber, thence over the outlet at the top of the chamber and downwardly on the opposite side of the chamber, and an enclosure forming a drying chamber and receiving that portion of the sheet material traveling downwardly, said enclosure being open at the bottom and provided at the top with a hood portion extending over the top of the heating chamber and projecting forwardly at the front of the same.

6. A drier for print washers comprising a vertically arranged interior heating chamber, means guiding the sheet material upwardly on one side of the chamber exteriorly thereof, thence over the chamber and downwardly on the other side of the heating chamber, means providing a drying chamber on the last named side, said means being provided with means which will permit the drying chamber to be opened substantially the full width of the drying chamber and the major portion of the height of the drying chamber, and the exterior of the first named side of the heater chamber being exposed for vision substantially its full width and height.

7. A drier for print washers comprising an upright interior heater chamber open at its bottom, means for guiding the sheet material upwardly on one side of the heater chamber exteriorly thereof, thence over the heater and downwardly on the other side of the heater, a heating device arranged in the heater chamber near the bottom of the latter, two plates arranged on opposite sides of the heating device, within the heater chamber, and spaced from the inner faces of said walls from their lower to their upper edges to provide air spaces for the upward travel of air between them and also on their outer sides.

HARRY HEWES SULLIVAN.